(12) United States Patent
Niergarth et al.

(10) Patent No.: US 10,443,412 B2
(45) Date of Patent: Oct. 15, 2019

(54) VARIABLE PITCH FAN PITCH RANGE LIMITER

(71) Applicant: General Electric Company, Schenectady, NY (US)

(72) Inventors: Daniel Alan Niergarth, Cincinnati, OH (US); Brandon Wayne Miller, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 1221 days.

(21) Appl. No.: 14/838,405

(22) Filed: Aug. 28, 2015

(65) Prior Publication Data
US 2017/0058683 A1 Mar. 2, 2017

(51) Int. Cl.
*F01D 7/00* (2006.01)
*F02K 1/66* (2006.01)
(Continued)

(52) U.S. Cl.
CPC ............... *F01D 7/00* (2013.01); *B64C 11/00* (2013.01); *F02C 9/58* (2013.01); *F02K 1/66* (2013.01);
(Continued)

(58) Field of Classification Search
CPC ... B64C 11/00; F01D 7/00; F02C 9/58; F02K 1/66; F04D 27/0292; F04D 29/323; F05D 2220/36; F05D 2240/30; F05D 2260/72; F05D 2260/74; F05D 2260/76; F05D 2270/46; F05D 2270/56; F05D 2270/62
(Continued)

(56) References Cited

U.S. PATENT DOCUMENTS 3,299,963 A 1/1967 Lowe
3,922,852 A 12/1975 Drabek
(Continued)

FOREIGN PATENT DOCUMENTS

CN 101903619 A 12/2010
GB 1 487 324 A 9/1977

OTHER PUBLICATIONS

First Office Action and Search issued in connection with corresponding CN Application No. 201610743520.0 dated Sep. 25, 2017.
(Continued)

*Primary Examiner* — Mark A Laurenzi
*Assistant Examiner* — Paul W Thiede
(74) *Attorney, Agent, or Firm* — Dority & Manning, P.A.

(57) ABSTRACT

A variable pitch fan for gas turbine engine is provided. The variable pitch fan includes a plurality of fan blades rotatably coupled to a disk and an actuation assembly for changing a pitch of each of the plurality of fan blades. The actuation assembly generally includes an actuation member operably connected to at least one of the plurality of fan blades and a pin. The pin is movable between a first position in which the pin is positioned at least partially in a channel defined in the actuation member, and a second position. The pin blocks movement of the actuation member relative to the pin past a range defined by the channel when in the first position. The actuation assembly further includes a retraction system for selectively engaging the pin in moving the pin from the first position to the second position.

18 Claims, 7 Drawing Sheets

(51) Int. Cl.
*F04D 27/02* (2006.01)
*F04D 29/32* (2006.01)
*F02C 9/58* (2006.01)
*B64C 11/00* (2006.01)

(52) U.S. Cl.
CPC ....... *F04D 27/0292* (2013.01); *F04D 29/323* (2013.01); *F05D 2220/36* (2013.01); *F05D 2240/30* (2013.01); *F05D 2260/72* (2013.01); *F05D 2260/74* (2013.01); *F05D 2260/76* (2013.01); *F05D 2270/46* (2013.01); *F05D 2270/56* (2013.01); *F05D 2270/62* (2013.01); *F05D 2270/64* (2013.01); *Y02T 50/673* (2013.01)

(58) Field of Classification Search
USPC ............................................ 416/153; 60/226
See application file for complete search history.

(56) References Cited

U.S. PATENT DOCUMENTS

| | | |
|---|---|---|
| 4,792,279 A | 12/1988 | Bergeron |
| 4,934,140 A * | 6/1990 | Dennison ................. F02C 7/20 |
| | | 244/54 |
| 4,976,102 A | 12/1990 | Taylor |
| 5,242,265 A | 9/1993 | Hora et al. |
| 5,931,637 A | 8/1999 | Wheeler |
| 8,851,849 B2 | 10/2014 | Swift et al. |
| 2017/0138370 A1* | 5/2017 | Miller ...................... F01D 7/00 |

OTHER PUBLICATIONS

European Search Report and Opinion issued in connection with corresponding EP Application No. 16185848.5 dated Jan. 30, 2017.

* cited by examiner

VARIABLE PITCH FAN PITCH RANGE LIMITER

FIELD OF THE INVENTION

The present subject matter relates generally to a variable pitch fan for a gas turbine engine, or more particularly to a variable pitch fan for a gas turbine engine having a pitch range limiter.

BACKGROUND OF THE INVENTION

A gas turbine engine generally includes a fan and a core arranged in flow communication with one another. Additionally, the core of the gas turbine engine generally includes, in serial flow order, a compressor section, a combustion section, a turbine section, and an exhaust section. In operation, an airflow is provided from the fan to an inlet of the compressor section where one or more axial compressors progressively compress the air until it reaches the combustion section. Fuel is mixed with the compressed air and burned within the combustion section to provide combustion gases. The combustion gases are routed from the combustion section to the turbine section. The flow of combustion gases through the turbine section drives the compressor section and is then routed through the exhaust section, e.g., to atmosphere. In particular configurations, the turbine section is mechanically coupled to the compressor section by one or more shafts extending along an axial direction of the gas turbine engine.

The fan includes a plurality of blades having a radius larger than the core of the gas turbine engine. The fan and plurality of blades may also be mechanically coupled to one of the one or more shafts such that they rotate along with the turbine. Rotation of the plurality of blades generates thrust for the gas turbine engine and provides airflow to the compressor section of the core.

For at least some gas turbine engines, the fan is a variable pitch fan. It can be desirable to vary a pitch of the fan blades by rotating the blades about respective pitch axes to further increase performance of the gas turbine engine. For example, a primary reason for changing blade pitch is to adjust the blade's angle of attack for optimal performance based on the present air speed of the aircraft and power level of the engine. Alternatively, the pitch of fan blades may be used to reverse the airflow, bypassing the core of the engine, thus providing reverse thrust to aerodynamically brake a landing aircraft.

An actuation member is typically provided in operable communication with the plurality of fan blades to change the pitch of the plurality of fan blades. The actuation member may be powered by, e.g., a hydraulic or electric system. If, however, the power system of the actuation member fails, it may be possible for the plurality of fan blades to rotate from a pitch range for generating forward thrust to a pitch range for generating reverse thrust. If such takes place during forward flight, damage may occur.

Accordingly, an actuation member having one or more safety mechanisms in place to prevent the plurality of fan blades from rotating from a pitch range for generating forward thrust to a pitch range for generating reverse thrust in the event of a system failure would be useful. More particularly, an actuation member having one or more safety mechanisms in place to prevent the plurality of fan blades from rotating from a pitch range for generating forward thrust to a pitch range for generating reverse thrust that can prevent such rotation independent of the power system of the actuation member would be particularly beneficial.

BRIEF DESCRIPTION OF THE INVENTION

Aspects and advantages of the invention will be set forth in part in the following description, or may be obvious from the description, or may be learned through practice of the invention.

In one exemplary embodiment of the present disclosure, a variable pitch fan for gas turbine engine is provided. The variable pitch fan includes a plurality of fan blades rotatably coupled to a disk, each of the plurality of fan blades defining a pitch. The variable pitch fan also includes an actuation assembly for changing a pitch of each of the plurality of fan blades. The actuation assembly includes an actuation member operably connected to at least one of the plurality of fan blades and defining a channel and a pin. The pin is moveable between a first position in which the pin is positioned at least partially in the channel defined in the actuation member and a second position. The pin blocks movement of the actuation member relative to the pin past a range defined by the channel when in the first position. The actuation member further includes a retraction system for selectively engaging the pin and moving the pin from the first position to the second position.

In another exemplary embodiment of the present disclosure, a variable pitch fan for a gas turbine engine is provided. The variable pitch fan includes a plurality of fan blades rotatably coupled to a disk, each of the plurality of fan blades defining a first pitch range and a second pitch range. The variable pitch fan also includes an actuation assembly for changing a pitch of the plurality of fan blades. The actuation assembly includes an actuation member operably connected to at least one of the plurality of fan blades. The actuation member defines a first range of motion corresponding to the first pitch range and a second range of motion corresponding to a second pitch range. The actuation member further defines a channel. The actuation member also includes a pin moveable between a first position in which the pin is positioned at least partially in the channel defined in the actuation member and a second position. The pin blocks the actuation member from the second range of motion when the pin is in the first position. The actuation member also includes a retraction system for selectively engaging the pin and moving the pin from the first position to the second position.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

Figure 1:
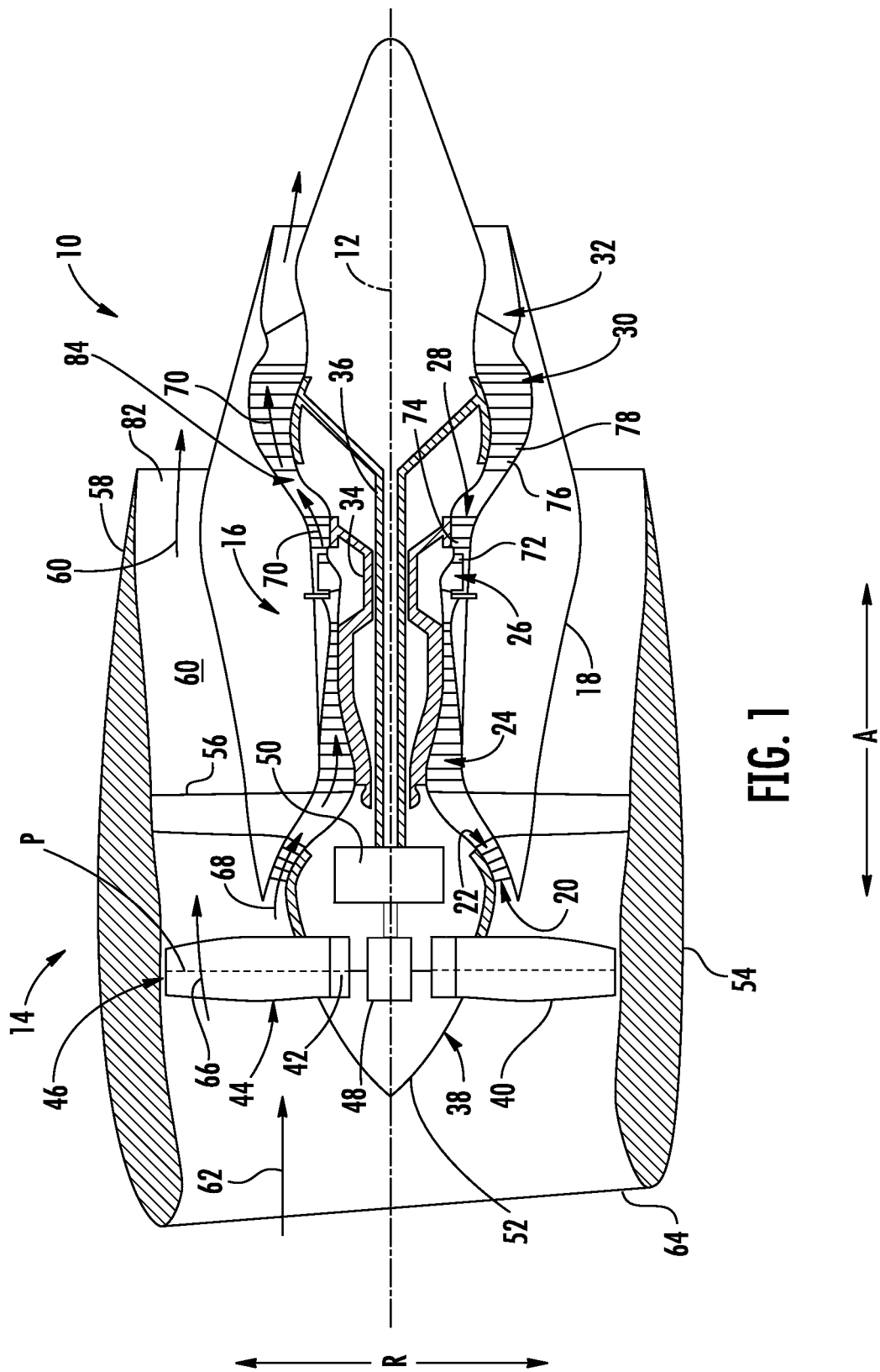
FIG. 1 is a schematic cross-sectional view of a gas turbine engine according to an exemplary embodiment of the present subject matter.

Repeat use of reference characters in the present specification and drawings is intended to represent the same or analogous features or elements of the present invention.

DETAILED DESCRIPTION OF THE INVENTION

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention. As used herein, the terms "first", "second", and "third" may be used interchangeably to distinguish one component from another and are not intended to signify location or importance of the individual components. The terms "upstream" and "downstream" refer to the relative direction with respect to fluid flow in a fluid pathway. For example, "upstream" refers to the direction from which the fluid flows, and "downstream" refers to the direction to which the fluid flows. In addition, it should be appreciated that the term "fluid" as used herein includes any material or medium that flows, including, but not limited to, gas and air.

Referring now to the drawings, wherein identical numerals indicate the same elements throughout the figures, FIG. 1 is a schematic cross-sectional view of a gas turbine engine in accordance with an exemplary embodiment of the present disclosure. More particularly, for the embodiment of FIG. 1, the gas turbine engine is a high-bypass turbofan jet engine 10, referred to herein as "turbofan engine 10." As shown in FIG. 1, the turbofan engine 10 defines an axial direction A (extending parallel to a longitudinal centerline 12 provided for reference), a radial direction R, and a circumferential direction C (see FIG. 2). In general, the turbofan 10 includes a fan section 14 and a core turbine engine 16 disposed downstream from the fan section 14.

The exemplary core 16 of the turbine engine 10 depicted generally includes a substantially tubular outer casing 18 that defines an annular inlet 20. The outer casing 18 encases, in serial flow relationship, a compressor section including a booster or low pressure (LP) compressor 22 and a high pressure (HP) compressor 24; a combustion section 26; a turbine section including a high pressure (HP) turbine 28 and a low pressure (LP) turbine 30; and a jet exhaust nozzle section 32. A high pressure (HP) shaft or spool 34 drivingly connects the HP turbine 28 to the HP compressor 24. A low pressure (LP) shaft or spool 36 drivingly connects the LP turbine 30 to the LP compressor 22.

Additionally, for the embodiment depicted, the fan section 14 includes a variable pitch fan 38 having a plurality of fan blades 40 coupled to a disk 42 in a spaced apart manner. As depicted, the fan blades 40 extend outwardly from disk 42 generally along the radial direction R. Each of the plurality of fan blades 40 defines a leading edge 44, or upstream edge, and a tip 46 defined at a radially outer edge of each respective fan blade 40. Each fan blade 40 is also rotatable relative to the disk 42 about a pitch axis P by virtue of the fan blades 40 being operatively coupled to a suitable actuation assembly 48 configured to vary the pitch of the fan blades 40 in a manner described in detail below. The fan blades 40, disk 42, and actuation assembly 48 are together rotatable about the longitudinal axis 12 by LP shaft 36 across a power gear box 50. The power gear box 50 includes a plurality of gears for stepping down the rotational speed of the LP shaft 36 to a more efficient rotational fan speed. Additionally, for the embodiment depicted, the disk 42 of the variable pitch fan 38 is covered by rotatable front hub 52 aerodynamically contoured to promote an airflow through the plurality of fan blades 40.

Referring still to the exemplary turbofan engine 10 of FIG. 1, the exemplary fan section 14 additionally includes an annular fan casing or outer nacelle 54 that circumferentially surrounds the fan 38 and/or at least a portion of the core turbine engine 16. It should be appreciated that the nacelle 54 may be configured to be supported relative to the core turbine engine 16 by a plurality of circumferentially-spaced outlet guide vanes 56. Moreover, a downstream section 58 of the nacelle 54 may extend over an outer portion of the core turbine engine 16 so as to define a bypass airflow passage 60 therebetween.

During operation of the turbofan engine 10, a volume of air 62 enters the turbofan 10 through an associated inlet 64 of the nacelle 54 and/or fan section 14. As the volume of air 62 passes across the fan blades 40, a first portion of the air as indicated by arrows 66 is directed or routed into the bypass airflow passage 60 and a second portion of the air as indicated by arrow 68 is directed or routed into the LP compressor 22. The ratio between the first portion of air 66 and the second portion of air 68 is commonly known as a bypass ratio. The pressure of the second portion of air 68 is then increased as it is routed through the high pressure (HP) compressor 24 and into the combustion section 26, where it is mixed with fuel and burned to provide combustion gases 70.

The combustion gases 70 are routed through the HP turbine 28 where a portion of thermal and/or kinetic energy from the combustion gases 70 is extracted via sequential stages of HP turbine stator vanes 72 that are coupled to the outer casing 18 and HP turbine rotor blades 74 that are coupled to the HP shaft or spool 34, thus causing the HP shaft or spool 34 to rotate, thereby supporting operation of the HP compressor 24. The combustion gases 70 are then routed through the LP turbine 30 where a second portion of thermal and kinetic energy is extracted from the combustion gases 70 via sequential stages of LP turbine stator vanes 76 that are coupled to the outer casing 18 and LP turbine rotor blades 78 that are coupled to the LP shaft or spool 36, thus causing the LP shaft or spool 36 to rotate, thereby supporting operation of the LP compressor 22 and/or rotation of the fan 38.

The combustion gases 70 are subsequently routed through a jet exhaust nozzle section 82 of the core turbine engine 16 to provide propulsive thrust. Simultaneously, the pressure of the first portion of air 66 is substantially increased as the first portion of air 66 is routed through the bypass airflow passage 60 before it is exhausted from a fan nozzle exhaust section 82 of the turbofan 10 also providing propulsive thrust. The HP turbine 28, the LP turbine 30, and the jet exhaust nozzle section 32 at least partially define a hot gas path 84 for routing the combustion gases 70 through the core turbine engine 16.

It should be appreciated, however, that the exemplary turbofan engine 10 described above with reference FIG. 1 is provided by way of example only. In other exemplary embodiments, the exemplary turbofan engine 10 may have any other suitable configuration. For example, in other exemplary embodiments, the turbofan engine 10 may have any other suitable number of, e.g., spools or shafts, compressors, and/or turbines.

Figure 2:
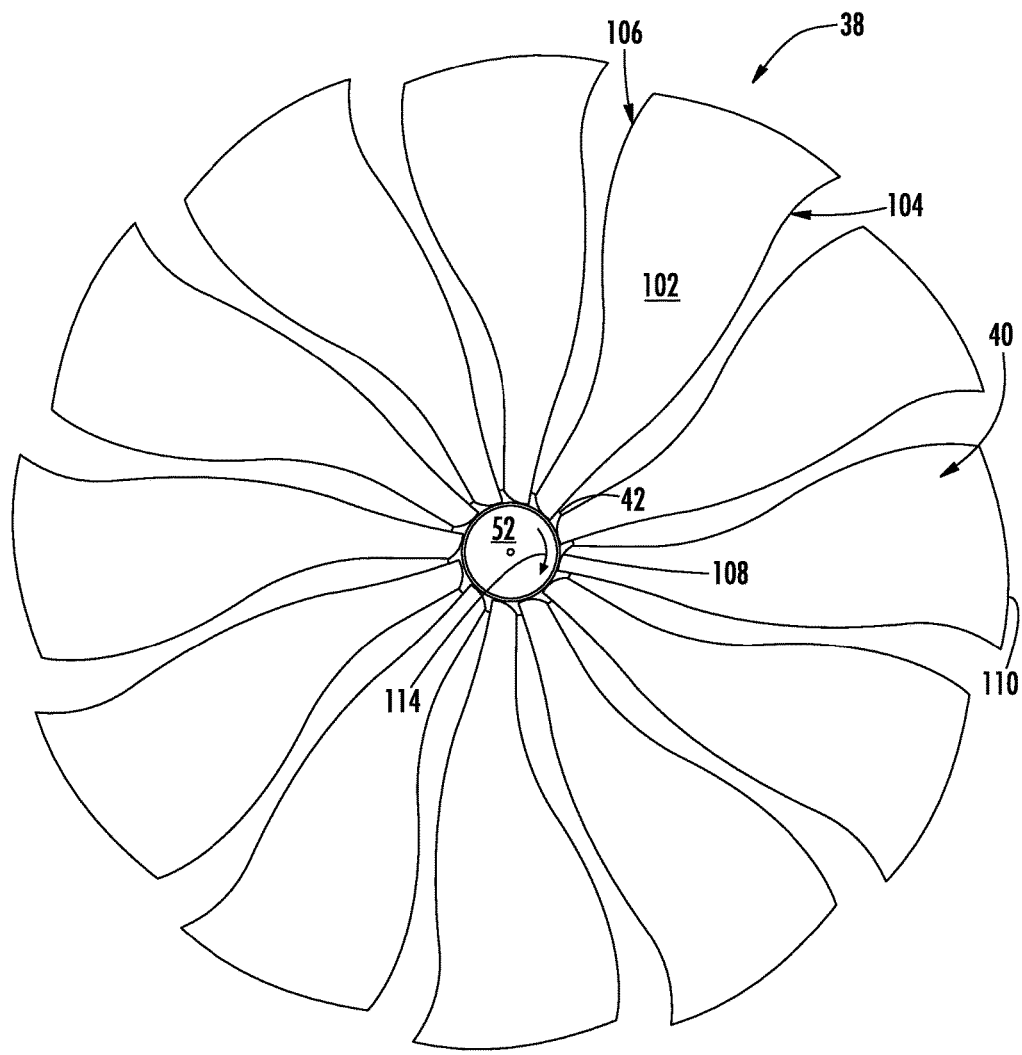
FIG. 2 is a forward-facing-aft elevational view of a fan illustrated in FIG. 1 in accordance with an exemplary embodiment of the present disclosure.
Figure 2:
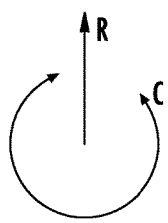

Referring now to FIG. 2, the fan 38 will be described in greater detail. FIG. 2 provides a forward-facing-aft elevational view of the fan 38 of the exemplary turbofan engine 10 of FIG. 1. For the exemplary embodiment depicted, the fan 38 includes twelve (12) fan blades 40. From a loading standpoint, such a blade count enables the span of each fan blade 40 to be reduced such that an overall diameter of fan 38 is also able to be reduced (e.g., to about twelve feet in the exemplary embodiment). That said, in other embodiments, the fan 38 may have any suitable blade count and any suitable diameter. For example, in one suitable embodiment, the fan 38 may have at least eight (8) fan blades 40, at least ten (10) fan blades 40, at least fifteen (15) fan blades 40, or at least eighteen (18) fan blades 40.

Each fan blade 40 may have a suitable aerodynamic profile, including e.g., a generally concave pressure side 100 (FIG. 3) and an opposite, generally convex suction side 102, as well as a leading edge 104 and an opposite trailing edge 106. Further, each fan blade 40 may generally define a cord line 105 (FIG. 3) extending between the leading edge 104 and trailing edge 26. Each fan blade 40 extends from an inner root end 108, which is rotatably coupled to the disk 42, to a radially outer distal tip 110, which for the embodiment depicted is disposed closely adjacent to the fan casing or nacelle 54 for providing a relatively small tip clearance or gap therebetween. It will be appreciated, of course, that in other exemplary embodiments, such as when the gas turbine engine is instead configured as an open rotor turbofan engine or as a turboprop engine, the outer distal tip 110 may not be positioned adjacent to any casing or nacelle.

Figure 3:
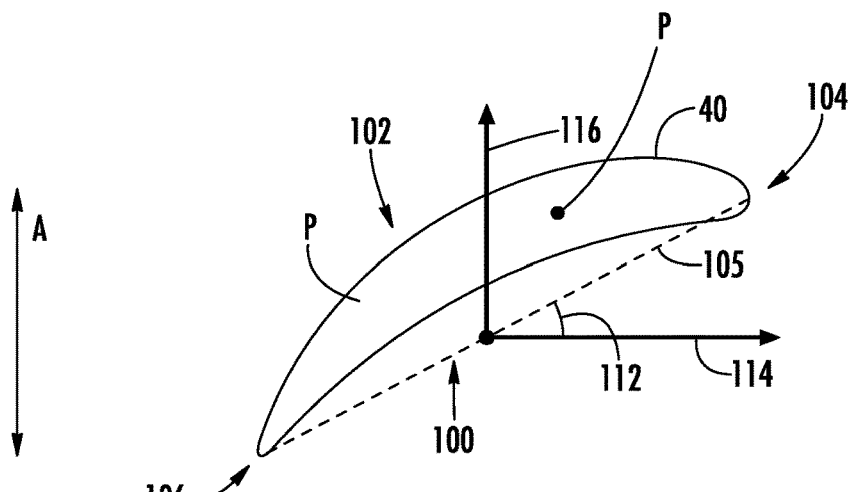
FIG. 3 is a radial cross-sectional view of a fan blade of the exemplary fan depicted in FIG. 2 defining a first pitch angle.
Figure 4:
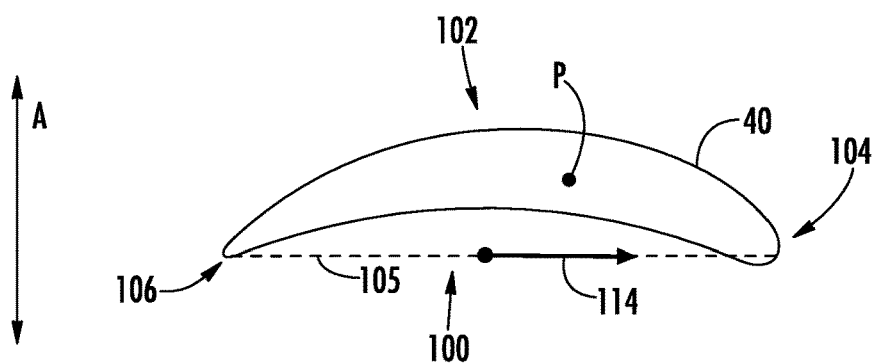
FIG. 4 is a radial cross-sectional view of a fan blade of the exemplary fan depicted in FIG. 2 defining a second pitch angle.
Figure 5:
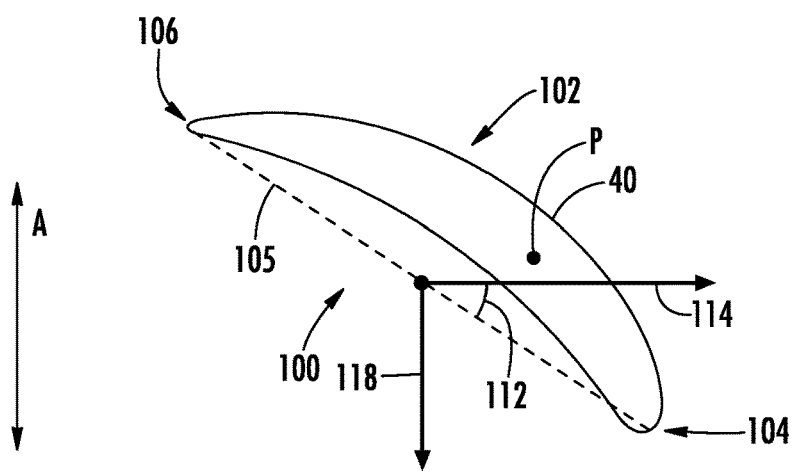
FIG. 5 is a radial cross-sectional view of a fan blade of the exemplary fan depicted in FIG. 2 defining a third pitch angle.

Referring now also to FIGS. 3 through 5, cross-sectional views are provided of an exemplary fan blade 40 as viewed along the radial direction R. As discussed above, each of the plurality of fan blades 40 are rotatable about a respective pitch axis P by the blade pitch actuation assembly 48. For the embodiment depicted, the fan blades 40 each define a pitch angle 112 relative to the direction of rotation, the direction of rotation indicated by arrow 114. Specifically, for the embodiment depicted, the pitch angle 112 of each respective fan blade 40 is defined between a respective cord line 105 and the direction of rotation 114. By varying the pitch angle 112, the fan 38 may be manipulated to provide a forward thrust 116 for the turbofan engine 10 (FIG. 3), no thrust for the turbofan engine 10 (FIG. 4), or alternatively to provide a reverse thrust 118 for the turbofan engine 10 (FIG. 5).

Specifically, the exemplary fan 38 depicted is capable of varying the pitch angle 112 of the plurality of fan blades 40 such that each of the plurality of fan blades 40 defines a first pitch range and a second pitch range. Particularly for the embodiment depicted, the first pitch range is configured for generating a forward thrust and the second pitch range is configured for generating a reverse thrust. The first pitch range for generating forward thrust may generally be a pitch angle 112 between about zero degrees and about ninety degrees, such as between about five degrees and about seventy-five degrees, such as between about ten degrees and about sixty degrees. Accordingly, as used herein, the first pitch range for generating forward thrust may additionally include a pitch angle 112 of the plurality of fan blades 40 for generating no thrust. Alternatively, the second pitch range for generating reverse thrust may be between about zero degrees and about minus ninety degrees, such as between about minus five degrees and about minus seventy-five degrees, such as between about minus ten degrees and about minus sixty degrees.

It should be appreciated, however, that in other exemplary embodiments, the first and second pitch ranges of the plurality of fan blades 40 may instead define any other suitable ranges of pitch angles 112. For example, the pitch angle 112 of each respective fan blade 40 that generates forward thrust versus reverse thrust may vary depending on a shape of such fan blade 40. Additionally, the first pitch range may not be a fixed pitch range. For example, the pitch angle 112 of each respective fan blade 40 that generates forward thrust may also vary depending on, e.g., a relative speed at which the fan 38 and engine 10 are traveling. Moreover, in still other exemplary embodiments, the first pitch range may instead be a pitch range at which the blades 40 generate forward thrust within an optimal efficiency range, and the second pitch range may be a pitch range at which the fan blades 40 still generate forward thrust, but less efficiently. In such an embodiment, the fan 38 may or may not be capable of generating reverse thrust.

Figure 6:
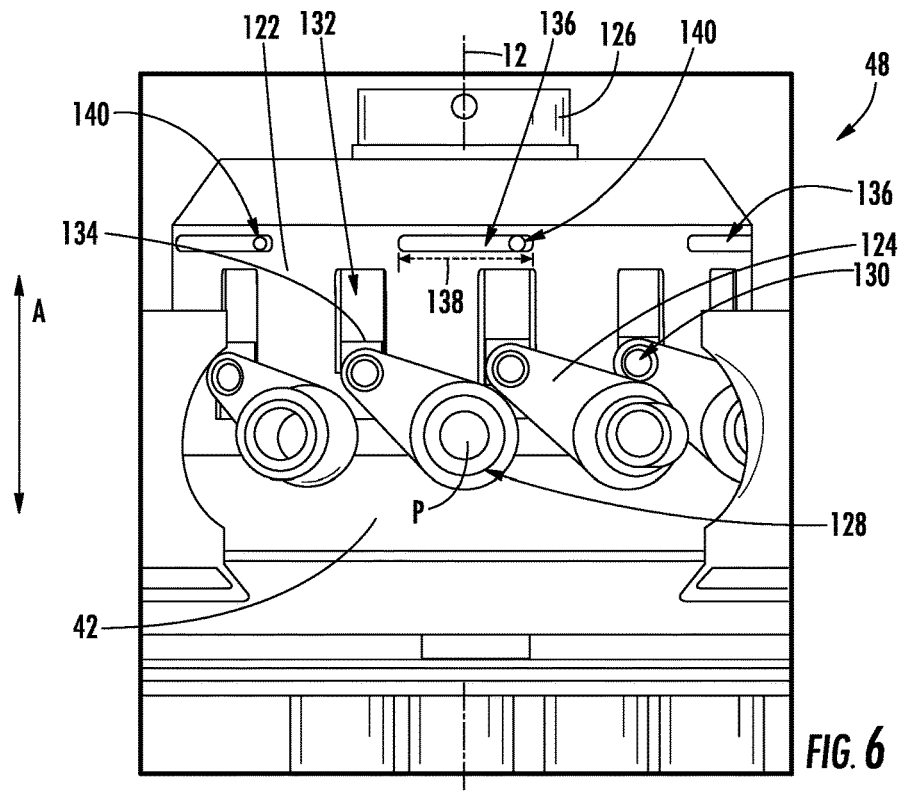
FIG. 6 is a schematic side view of an actuation assembly of the exemplary variable pitch fan of FIG. 2, where the fan blades are in a first position.
Figure 7:
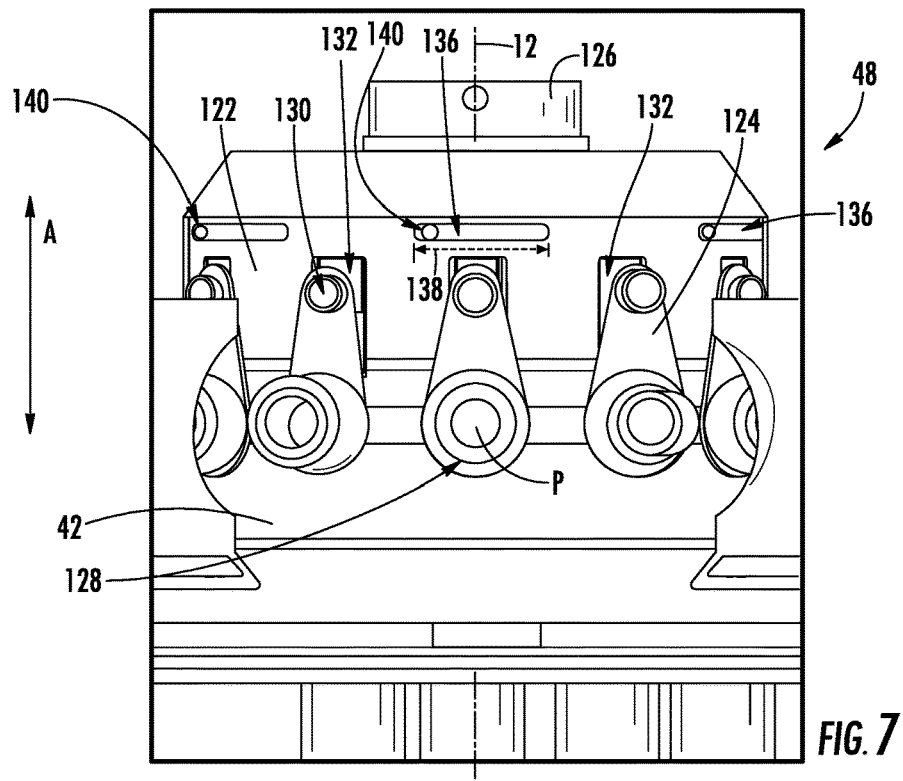
FIG. 7 is a schematic side view of an actuation assembly of the exemplary variable pitch fan of FIG. 2, where the fan blades are in a second position.

Referring now generally to FIGS. 6 and 7, a blade pitch actuation assembly 48 in accordance with an exemplary embodiment of the present disclosure is depicted. As mentioned above, each fan blade 40 is rotatable relative to the disk 42 about a pitch axis P. The fan blades 40, disk 42, and actuation assembly 48 are together rotatable about the longitudinal axis 12 by LP shaft 36 across a power gear box 50 (FIG. 1). The fan 38 may additionally include a fan shaft 120 mechanically coupling the power gear box to the disk 42 (see FIG. 12, below).

The actuation assembly 48 generally includes a plurality of actuation members. Specifically for the embodiment depicted, the actuation assembly 48 includes a scheduling ring 122, plurality of linkage arms 124, and an actuator 126. For the embodiment depicted, the actuator 126 is a rotary hydraulic actuator. However, in other embodiments, the actuator 126 may instead be an electric actuator (i.e., an electric motor). Each fan blade 40 may be rotatably coupled to the disk 42 through a corresponding linkage arm 124. Specifically, each fan blade 40 may be rotatably coupled to a first end 128 of a corresponding linkage arm 124, such that the first end 128 and the corresponding fan blade 40 may rotate about pitch axis P relative to disk 42. In this regard, the fan blade 40 may be fixedly connected to the first end 128 of the corresponding linkage arm 124, such that rotation of the linkage arm 124 causes the fan blade 40 to rotate relative to the disk 42.

A second end 130 of the linkage arm 124 may be slidably connected to one of the plurality of slots 132 defined in scheduling ring 122. For example, the second end 128 may be rotatably connected to a sliding member 134. The sliding member 134 may be slidably received in a slot 132 of the scheduling ring 122.

The scheduling ring 122 is rotatable about longitudinal centerline 12 relative to the disk 42 and is operatively coupled with the actuator 126, which is fixed relative to the disk 42. In operation, the actuator 126 rotates the scheduling ring 122 relative to the disk 42. As the scheduling ring 122 rotates, each of the respective sliding members 134 move along a corresponding slot 132 and the angular position of the respective linkage arm 124 changes. As each linkage arm 124 rotates, the corresponding fan blade 40 rotates as well, thus rotating each fan blade 40 about pitch axis P.

In this regard, a position of the scheduling ring 122 dictates a pitch angle 112 of each of the plurality of fan blades 40. Therefore, by rotating the scheduling ring 122 relative to the disk 42, each of the plurality of fan blades 40 rotate about their respective pitch axes P to a corresponding pitch angle 112. Accordingly, for the embodiment depicted, the scheduling ring 122 defines a first range of motion which corresponds to the first pitch range defined by each of the plurality of fan blades 40. Specifically, the first range of motion of the scheduling ring 122 may be a first range of motion relative to the disk 42 (and a pin assembly 140, discussed below). The first pitch range, and thus the first range of motion of the scheduling ring 122, may therefore correspond to a pitch angle 112 for generating forward thrust (or no thrust). For the embodiment depicted, this first range of motion is exhibited in FIGS. 6 and 7. Specifically, the position of the scheduling ring 122 in FIG. 6 may result in the fan blades 40 defining the exemplary pitch angle 112 depicted in FIG. 3, and the position of the scheduling ring 122 in FIG. 7 may result in the fan blades 40 defining the exemplary pitch angle 112 depicted in FIG. 4.

It should be appreciated, however, that the exemplary actuation assembly 48 depicted in FIGS. 6 and 7 is provided by way of example only. In other exemplary embodiments, any other suitable actuation assembly 48 may be provided. For example, although the exemplary actuation assembly 48 of FIGS. 6 and 7 includes a plurality of linkage arms 124, in other exemplary embodiments, the actuation assembly 48 may replace the linkage arms 124 with gears configured to interact with one or more mating gears on the scheduling ring 122. Moreover, although the actuation assembly 48 is depicted as a rotary actuator (i.e., the actuation assembly 48 changes the pitch angles 112 of the plurality of the plurality of fan blades 40 by rotating about the axial direction A and longitudinal centerline 12 relative to the disk 42), in other exemplary embodiments, the actuation assembly 48 may instead be configured as an electric or hydraulic linear actuator. With such an exemplary embodiment, the actuation assembly 48 may instead include one or more members configured to move along the axial direction A relative to the disk 42 in order to change the pitch angles 112 of the plurality of fan blades 40. Additionally, although the slots 132 defined in the exemplary scheduling ring 122 of FIGS. 6 and 7 are depicted extending generally along the longitudinal centerline 12, in other exemplary embodiments, the slots 132 may define a curved or other shape so as to provide for particular schedules for each of the individual fan blades 40 to, e.g., prevent overlapping fan blades 40 from running into each other during operation.

Referring back to the Figures, it will be appreciated that generating reverse thrust during flight may result in detrimental effects to such flight. Accordingly, the actuation assembly 48 depicted further includes a mechanism for ensuring the scheduling ring 122 does not move past the first range of motion without a positive step being taken to allow for such movement. Specifically, the exemplary scheduling ring 122 depicted defines a plurality of channels 136. The exemplary channels 136 depicted extend generally along the circumferential direction C and each defines a length 138. The length 138 of each channel 136, for the embodiment depicted, corresponds to an allowable range of motion of the scheduling ring 122 during forward flight, i.e., an allowable pitch range for the plurality of fan blades 40 during forward flight. Particularly for the embodiment depicted, the length 138 of each channel 136 represents the first pitch range of the plurality of fan blades 40. Accordingly, for the embodiment depicted, the length 138 of each channel 136 may represent a pitch range in which the plurality of fan blades 40 are configured for generating forward thrust or no thrust. However, in other embodiments, the first pitch range of the fan blades 40 may instead correspond to any other suitable pitch range, as discussed above.

A pin assembly 140 is provided for engaging each of the channels 136 to ensure the scheduling ring 122 is maintained within the first range of motion when, e.g., reverse thrust is not desired. Notably, although for the embodiment depicted a plurality of pin assemblies 140 are provided with the corresponding number of channels 136 defined in the exemplary scheduling ring 122, in other exemplary embodiments, any other suitable number of pin assemblies 140 and channels 136 may be provided.

Figure 8:
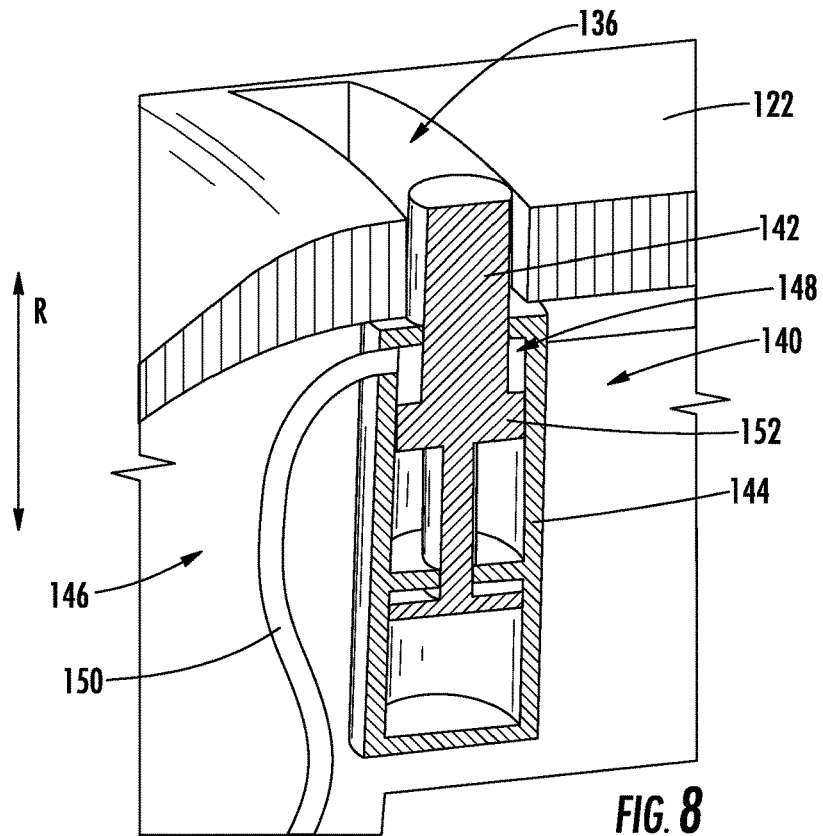
FIG. 8 is a cross-sectional view of a pin assembly in accordance with an exemplary embodiment of the present disclosure as may be incorporated in the actuation assembly depicted in FIG. 6.
Figure 9:
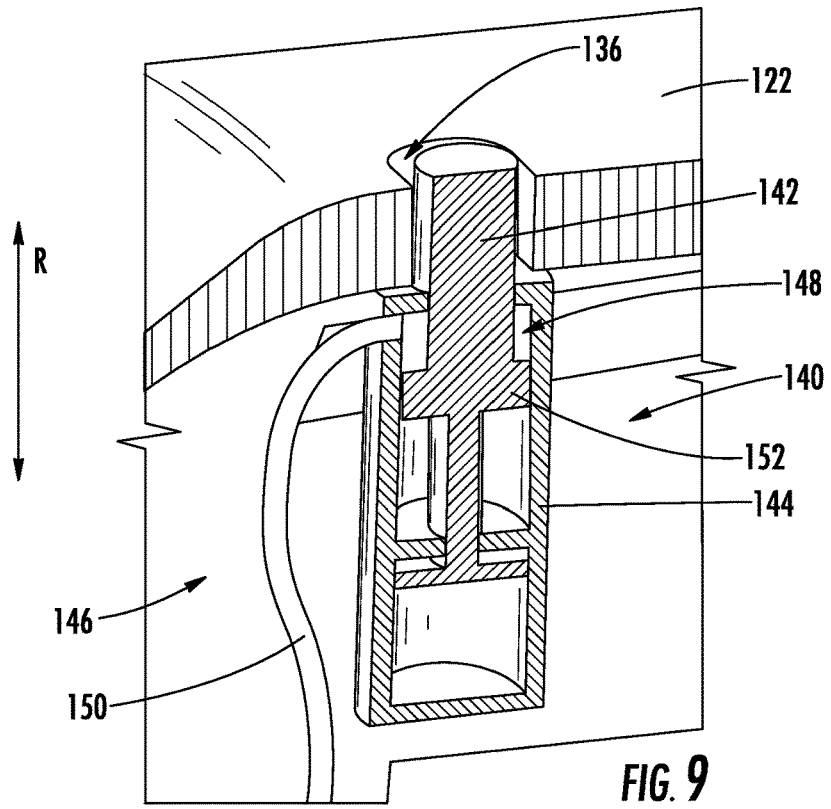
FIG. 9 is a cross-sectional view of a pin assembly in accordance with an exemplary embodiment of the present disclosure as may be incorporated in the actuation assembly depicted in FIG. 7.

Referring now also to FIGS. 8 and 9, close-up, cross-sectional views of a pin assembly 140 in accordance with an exemplary embodiment is provided. Specifically, FIG. 8 provides a close-up, cross-sectional view of the exemplary pin assembly 140 with the scheduling ring 122 in the position depicted in FIG. 6, and FIG. 9 provides a close-up, cross-sectional view of the exemplary pin assembly 140 with the scheduling ring 122 in the position depicted in FIG. 7.

Figure 10:
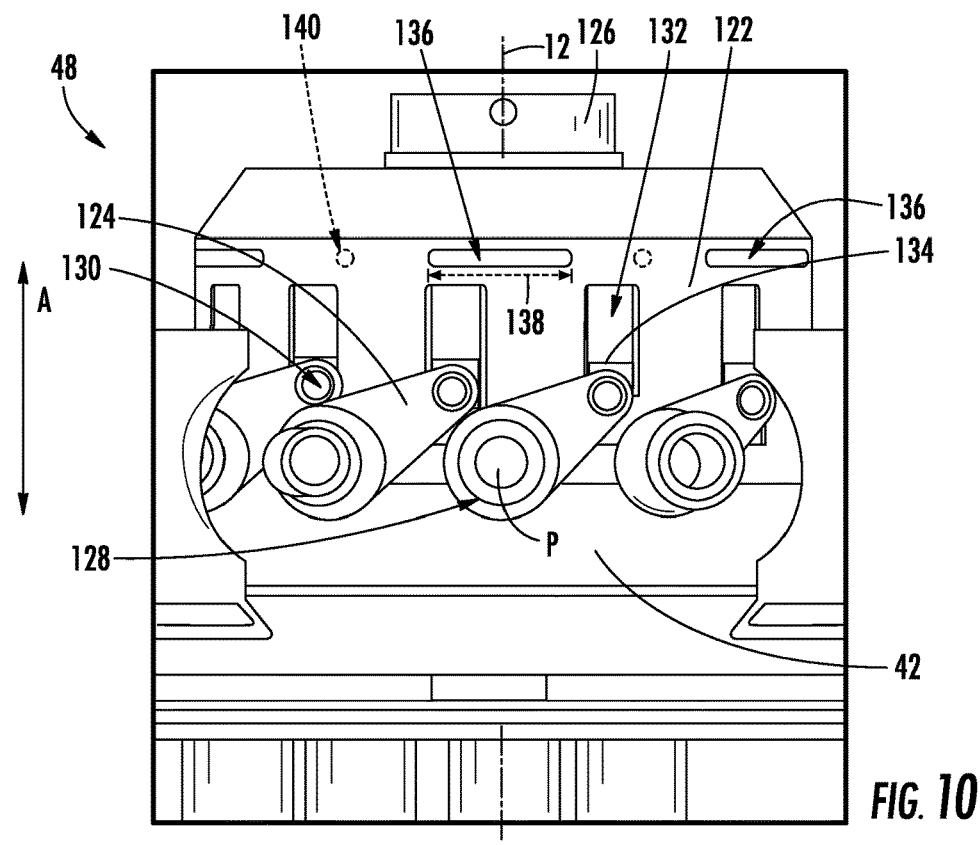
FIG. 10 is a schematic side view of the exemplary actuation assembly of the exemplary variable pitch fan of FIG. 2, where the fan blades are in a third position.
Figure 11:
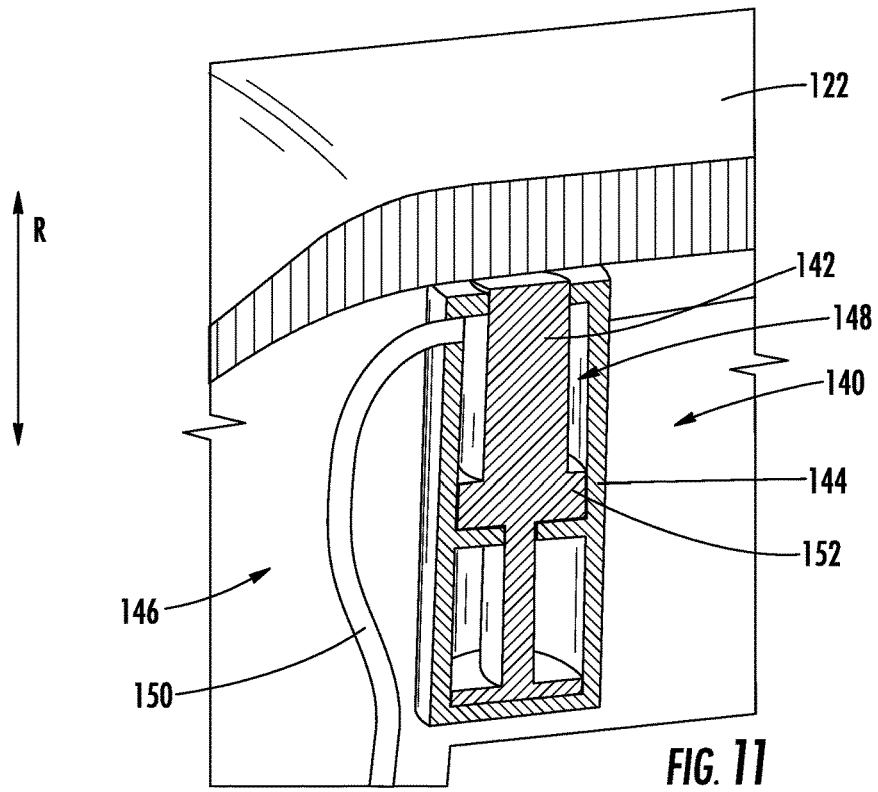
FIG. 11 is a cross-sectional view of a pin assembly in accordance with an exemplary embodiment of the present disclosure as may be incorporated in the actuation assembly depicted in FIG. 10.

The exemplary pin assembly 140 depicted generally includes a pin 142 and a pin body 144. The pin 142 is movable linearly within the pin body 144 between a first position (FIGS. 6 through 9) and a second position (FIGS. 10 and 11, discussed below). As shown, when the pin 142 is in the first position, the pin 142 is at least partially positioned within a respective channel 136 defined by the scheduling ring 122. The pin 142, when positioned at least partially within the respective channel 136 defined by the scheduling ring 122, blocks movement of the scheduling ring 122 relative to the pin 142 past the range defined by the length 138 of the channel 136. Accordingly, for the embodiment depicted, the exemplary pin 142 of the pin assembly 140 (when in the first position) blocks movement of the scheduling ring 122 outside of the first range of motion of the scheduling ring 122, preventing the plurality of fan blades 40 from defining pitch angles 112 outside of the first pitch range, which may be a range of pitch angles 112 for generating forward thrust or no thrust.

As previously stated, however, in at least certain situations, it may be beneficial to for the fan blades 40 to move outside the first pitch range, e.g., to generate an amount of reverse thrust with the fan 38. Accordingly, referring now to FIGS. 10 and 11, views of an actuation assembly 48 and pin assembly 140 are provided in a configuration for moving the fan blades 40 out of the first pitch range. Specifically, the scheduling ring 122 further defines a second range of motion relative to the disk 42 and pin assembly 140. The second range of motion of the scheduling ring 122 corresponds to the second pitch range defined by each of the plurality of fan blades 40. For the embodiment depicted, the second pitch range of the plurality of fan blades 40 is a range of pitch angles 112 at which the plurality of fan blades 40 are configured for generating reverse thrust. However, in other embodiments, the second pitch range may additionally, or alternatively, correspond to a range of pitch angles 112 outside an optimal range of efficiency of the fan blades 40.

As shown, however, the second range of motion of the scheduling ring 122 is outside of the allowable range provided for by the length 138 of the channels 136 defined in the scheduling ring 122. Accordingly, in order to enter into the second range of motion, the pin 142 of the pin assembly 140 must be moved to the second position, such that the pin 142 is not positioned at least partially within the channel 136 defined by the scheduling ring 122, and thus is not blocking such movement. Accordingly, a retraction system 146 is included for selectively engaging the pin 142 and moving the pin 142 from the first position to the second position. For the embodiment depicted, the retraction system 146 is a hydraulic retraction system utilizing hydraulic pressure to selectively move the pin 142 from the first position to the second position when activated.

Figure 12:
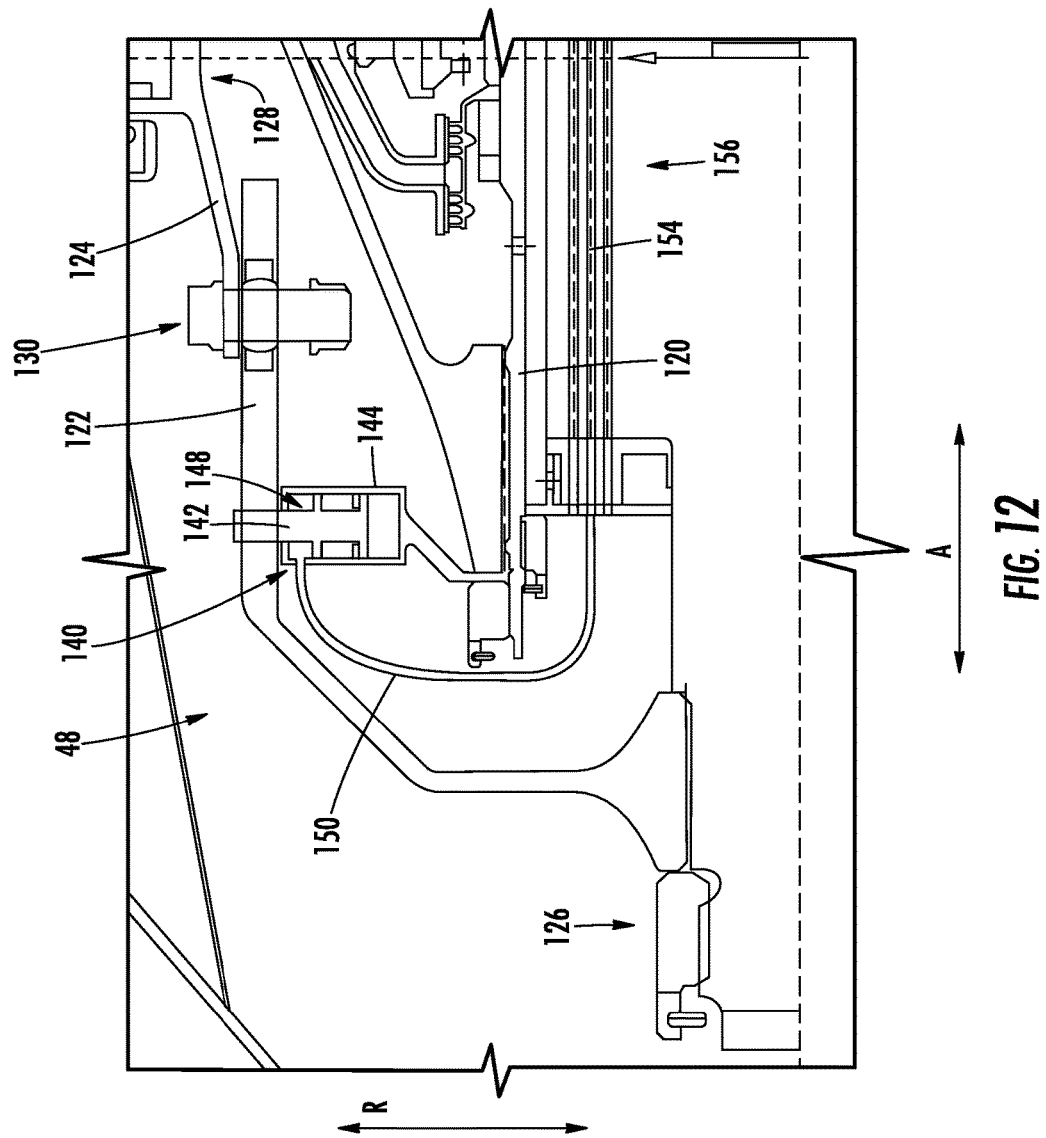
FIG. 12 is a schematic, cross-sectional view of the actuation assembly of the exemplary variable pitch fan of FIG. 2.

For example, referring particularly to FIG. 11, and now also to FIG. 12, providing a side, cross-sectional view of the exemplary actuation assembly 48, the exemplary pin assembly 140 includes a top chamber 148 defined by the pin body 144. The top chamber 148 of the pin body 144 is fluidly connected to a hydraulic fluid line 150. For the embodiment depicted, the hydraulic fluid line 150 is fluidly connected to a drain line 154 of the turbofan engine 10, which may be pressurized when the wheels of an aircraft to which the turbofan engine 10 is mounted are on the ground. However, in other exemplary embodiments, the hydraulic fluid line 150 may instead be a separate hydraulic fluid line activated independently of the other actuator hydraulic lines 156 (including, e.g., the drain line 154) of the turbofan engine 10.

When the retraction system 146 is activated to retract the pin 142, i.e., to move the pin 142 to the second position, the hydraulic fluid line 150 provides pressurized hydraulic fluid to the top chamber 148. The fluid in the top chamber 148 increases a pressure in the top chamber 148, and presses the pin 142 inwardly generally along the radial direction R towards the second position. More specifically, the hydraulic fluid presses an annular flange 152 on the pin 142 inwardly along the radial direction R, moving the pin 142 to the second position.

After selectively engaging the pin 142 and moving the pin 142 to the second position, the pin 142 may be moved back to the first position by disengaging the retraction system 146 and rotating the fan 38. The centrifugal force will move the pin 142 back into the first position. Notably, when the retraction system 146 is not activated, there are no biasing forces pressing the pin 142 into the second position. Accordingly, when the retraction system 146 is not activated, the pin 142 may be moved to the first position with a minimal centrifugal force, such that the pin 142 may be moved to the first position by rotating the fan 38 at relatively low speeds.

It should be appreciated, however, that in other exemplary embodiments, any other suitable retraction system 146 may be provided. For example, in other exemplary embodiments, the retraction system 146 may be an electrical system using an electrical actuator to move the pin 142 from the first position to the second position. Alternatively, the retraction system 146 may be an electromagnetic retraction system. Further, in still other exemplary embodiments, the retraction system 146 may be a pneumatic retraction system. Furthermore, it should be appreciated that although the exemplary pin assembly 140 depicted includes a pin 142 extending linearly between the first position and the second position, in other exemplary embodiments, the pin 142 may instead pivot or rotate between the first position and the second position. Further, although the exemplary pin 142 generally defines a cylindrical shape, in other exemplary embodiments, the pin 142 of the pin assembly 140 may define any other suitable shape allowing the pin 142 to move between the first and second positions.

Moreover, in still other exemplary embodiments, the actuation assembly 48 may instead have a pin assembly 140 interacting with any other suitable actuation member. For example, in other exemplary embodiments, one or more of the linkage arms 124 of the exemplary actuation assembly 48 may define a channel therein. In such an exemplary embodiment, a pin of a pin assembly may be configured to interact with such channel to block movement of the linkage arm 124 relative to the pin past a range defined by the channel, e.g., in much the same manner as described above.

Referring now particularly to FIG. 12, it should be appreciated that the pin assembly 140 is attached to a fan shaft 120 (which may be driven by, e.g., the LP shaft 36 across the power gear box 50) and that the pin body 144 of the pin assembly 140 is fixed relative to the fan shaft 120. However, in other exemplary embodiments, the pin body 144 may instead be fixed relative to any other suitable member that rotates with the disk 42 and the plurality of fan blades 40.

A fan for a gas turbine engine having an actuation assembly in accordance with an exemplary embodiment of the present disclosure may provide for assurances that the plurality of fan blades will not, e.g., move into a pitch range for generating reverse thrust during flight, despite, e.g., a loss of system pressure. Additionally, a fan for a gas turbine engine having an actuation assembly in accordance with an exemplary embodiment of the present disclosure may allow for disengagement of the safety feature immediately upon wheels touching the ground or some other condition after which reverse thrust may be desired. Further, a fan for gas turbine engine having an actuation assembly in accordance with an exemplary embodiment of the present disclosure may allow for the safety feature to be engaged when rotating the fan at relatively low speeds.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A variable pitch fan for a gas turbine engine, the variable pitch fan comprising:
 a plurality of fan blades rotatably coupled to a disk, each of the plurality of fan blades defining a pitch; and an actuation assembly for changing a pitch of each of the plurality of fan blades, the actuation assembly including an actuation member operably connected to at least one of the plurality of fan blades and defining a channel, wherein the actuation member is a scheduling ring rotatable relative to the disk; and a pin moveable between a first position in which the pin is positioned at least partially in the channel defined in the actuation member and a second position, the pin blocking movement of the actuation member relative to the pin past a range defined by the channel when in the first position; and a retraction system for selectively engaging the pin and moving the pin from the first position to the second position.

2. The variable pitch fan of claim 1, wherein the scheduling ring defines a plurality of slots, wherein the actuation assembly further includes a plurality of linkage arms, wherein each linkage arm is operatively coupled to one of the plurality of fan blades and to one of the plurality of slots defined by the scheduling ring.

3. The variable pitch fan of claim 1, wherein the channel defined in the scheduling ring extends generally along a circumferential direction.

4. The variable pitch fan of claim 1, wherein the channel defines a length, wherein the length of the channel represents a first pitch range of the plurality of fan blades.

5. The variable pitch fan of claim 4, wherein the plurality of fan blades further define a second pitch range, wherein the actuation member defines a range of motion relative to the pin greater than a length of the channel when the pin is in the second position, and wherein the increased range of motion of the actuation member corresponds to the second pitch range of the plurality of fan blades.

6. The variable pitch fan of claim 1, wherein the actuation assembly further includes a pin body, wherein the pin is movable between the first position and second position relative to the pin body.

7. The variable pitch fan of claim 6, wherein the pin moves linearly between the first position and second position relative to the pin body.

8. The variable pitch fan of claim 6, wherein the retraction system is a hydraulic retraction system utilizing hydraulic pressure to selectively move the pin to the second position.

9. The variable pitch fan of claim 6, wherein the plurality of fan blades are rotatable by a fan shaft, and wherein the pin body is fixed relative to the fan shaft.

10. The variable pitch fan of claim 1, wherein the actuation member is a linkage arm, wherein the actuation assembly further includes a plurality of linkage arms, and wherein each linkage arm is operably coupled to one of the plurality of fan blades.

11. A variable pitch fan for a gas turbine engine, the variable pitch fan comprising:

a plurality of fan blades rotatably coupled to a disk, each of the plurality of fan blades defining a first pitch range and a second pitch range; and an actuation assembly for changing a pitch of the plurality of fan blades, the actuation assembly including an actuation member operably connected to at least one of the plurality of fan blades, the actuation member defining a first range of motion corresponding to the first pitch range and a second range of motion corresponding to a second pitch range, the actuation member further defining a channel, wherein the actuation member is a scheduling ring rotatable relative to the disk; and a pin moveable between a first position in which the pin is positioned at least partially in the channel defined in the actuation member and a second position, the pin blocking the actuation member from the second range of motion when the pin is in the first position; and a retraction system for selectively engaging the pin and moving the pin from the first position to the second position.

12. The variable pitch fan of claim 11, wherein the first range of motion of the actuation member is a first range of motion relative to the disk, and wherein the second range of motion of the actuation member is a second range of motion relative to the disk.

13. The variable pitch fan of claim 11, wherein the scheduling ring defines a plurality of slots, wherein the actuation assembly further includes a plurality of linkage arms, wherein each linkage arm is operatively coupled to one of the plurality of fan blades and to one of the plurality of slots defined by the scheduling ring.

14. The variable pitch fan of claim 11, wherein the channel defined in the scheduling ring extends generally along a circumferential direction.

15. The variable pitch fan of claim 11, wherein the channel defines a length, wherein the length of the channel represents the first range of motion of the actuation member.

16. The variable pitch fan of claim 11, wherein the actuation assembly further includes a pin body, wherein the pin is movable between the first position and second position relative to the pin body.

17. The variable pitch fan of claim 16, wherein the pin moves linearly between the first position and second position relative to the pin body.

18. The variable pitch fan of claim 16, wherein the retraction system is a hydraulic retraction system utilizing hydraulic pressure to selectively move the pin to the second position.

* * * * *